US009189171B2

(12) United States Patent
Ando

(10) Patent No.: US 9,189,171 B2
(45) Date of Patent: Nov. 17, 2015

(54) STORAGE SYSTEM AND METHOD FOR CONTROLLING STORAGE SYSTEM

(71) Applicant: FUJITSU LIMITED, Kawasaki-shi (JP)

(72) Inventor: Shun Ando, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 414 days.

(21) Appl. No.: 13/871,511

(22) Filed: Apr. 26, 2013

(65) Prior Publication Data

US 2014/0006736 A1 Jan. 2, 2014

(30) Foreign Application Priority Data

Jun. 29, 2012 (JP) ................................. 2012-147631

(51) Int. Cl.
*G06F 12/00* (2006.01)
*G06F 3/06* (2006.01)
*G06F 11/07* (2006.01)

(52) U.S. Cl.
CPC ................ *G06F 3/065* (2013.01); *G06F 3/061* (2013.01); *G06F 3/0608* (2013.01); *G06F 3/0619* (2013.01); *G06F 3/0659* (2013.01); *G06F 3/0683* (2013.01); *G06F 3/0689* (2013.01); *G06F 11/0778* (2013.01); *G06F 11/0727* (2013.01)

(58) Field of Classification Search
CPC ....................................... G06F 11/07–11/0787
See application file for complete search history.

(56) References Cited

FOREIGN PATENT DOCUMENTS

| EP | 1 333 379 A2 | 8/2003 |
|----|--------------|--------|
| JP | 2001-034508  | 2/2001 |
| JP | 2003-271435  | 9/2003 |
| JP | 2005-293224  | 10/2005 |
| JP | 2007-334668  | 12/2007 |

*Primary Examiner* — Reginald Bragdon
*Assistant Examiner* — Hannah A Faye-Joyner
(74) *Attorney, Agent, or Firm* — Staas & Halsey LLP

(57) ABSTRACT

A storage system includes a plurality of control devices each including an interface unit and an arithmetic processing unit. The arithmetic processing unit stores, when requested to execute saving processing for saving dump data of a specific interface unit in which an error has occurred, the dump data collected from the specific interface unit into a storage unit. The arithmetic processing unit calculates an execution time of the saving processing. The arithmetic processing unit compresses, when the execution time exceeds a time limit and before a remaining time is reached, part of the dump data stored in the storage unit and save the compressed dump data into a saving unit. The arithmetic processing unit saves, when the execution time exceeds the time limit and after the remaining time has been reached, rest of the dump data stored in the storage unit into the saving unit without compression.

12 Claims, 10 Drawing Sheets

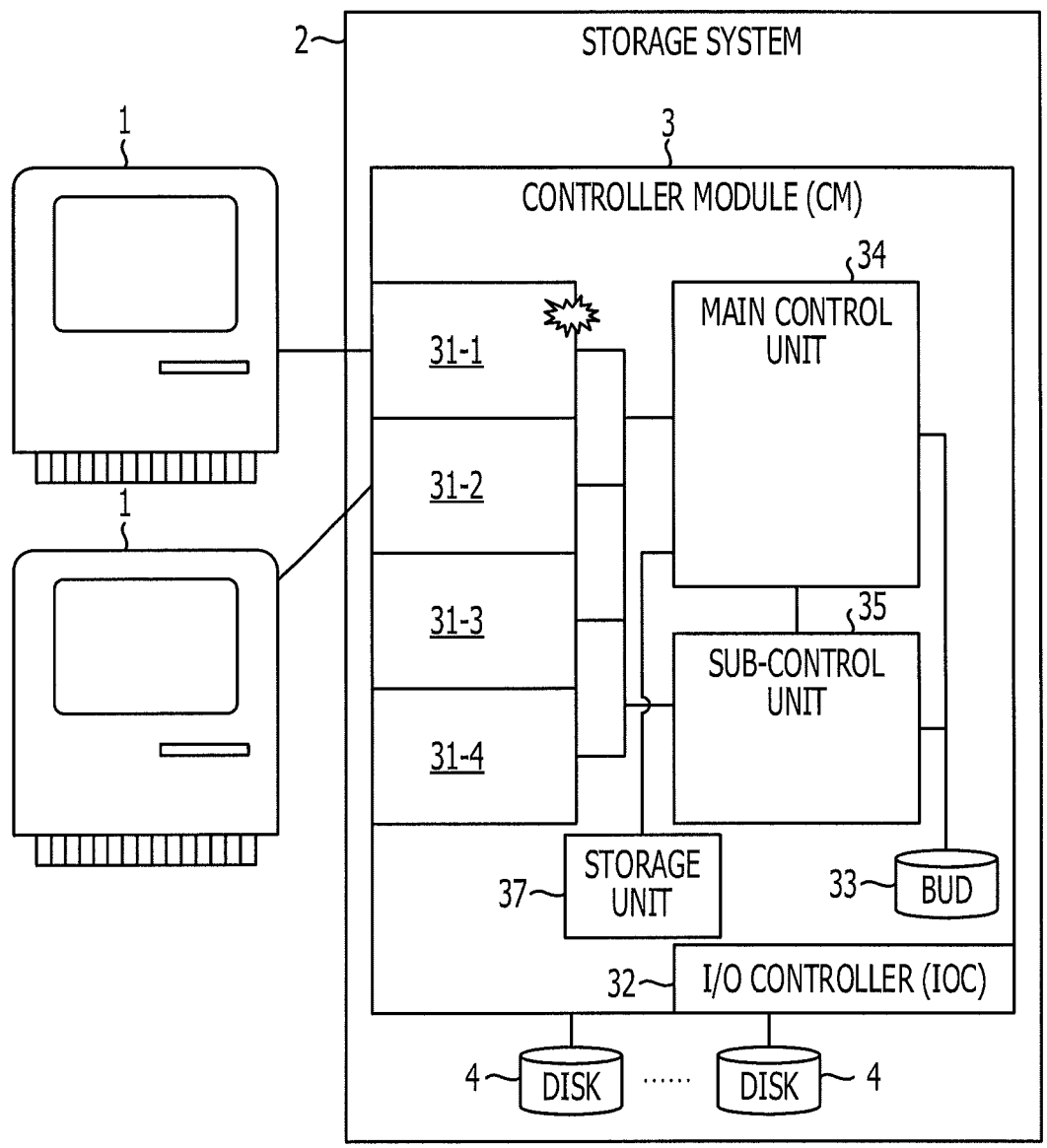

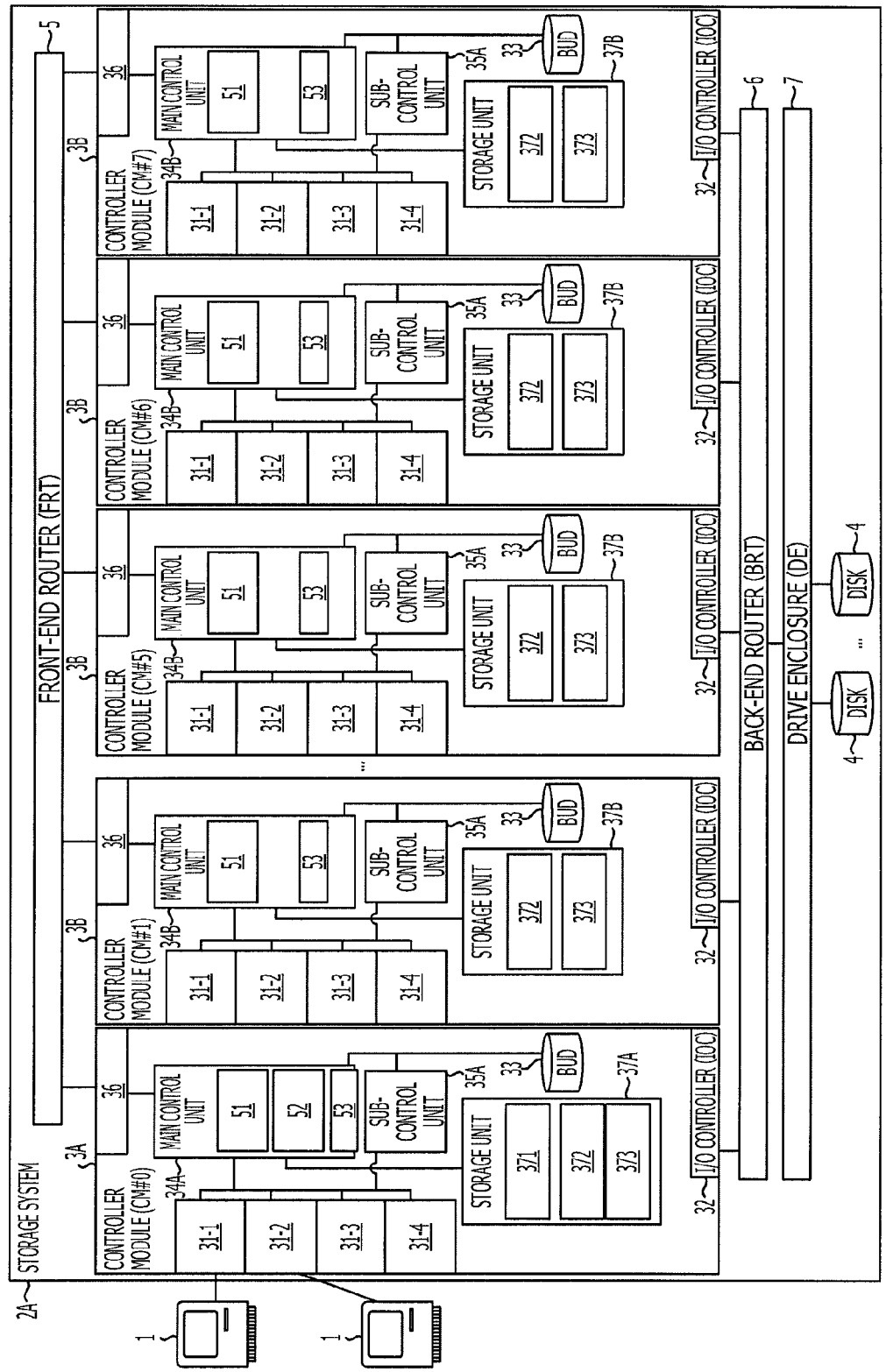

FIG. 3

| CPU | ACTIVE FLAG | SIPHONING TARGET CA | CA DUMP SIPHONING TIME (S) | CPU USAGE RATE | CA DUMP SIPHONING EXECUTION TIME (S) | I/O COMMAND NUMBER | I/O PROCESSING TIME (S) |
|---|---|---|---|---|---|---|---|
| CM#0 MAIN CPU | OFF | - | 50 | 0.8 | 250 | CROSS 100/ STRAIGHT 100 | 2 |
| CM#0 SUB CPU | OFF | - | 50 | 0.8 | 250 | CROSS 120/ STRAIGHT 100 | 2.2 |
| CM#1 MAIN CPU | OFF | - | 45 | 0.2 | 56.3 | CROSS 50/ STRAIGHT 50 | 1 |
| CM#1 SUB CPU | OFF | - | 45 | 0.3 | 64.3 | CROSS 50/ STRAIGHT 50 | 1 |
| CM#2 MAIN CPU | OFF | - | 50 | 0.4 | 83.3 | CROSS 80/ STRAIGHT 70 | 1.5 |
| CM#2 SUB CPU | OFF | - | 50 | 0.1 | 55.6 | CROSS 80/ STRAIGHT 90 | 1.7 |
| CM#3 MAIN CPU | OFF | - | 50 | 0.5 | 100 | CROSS 100/ STRAIGHT 100 | 2 |
| CM#3 SUB CPU | OFF | - | 50 | 0.5 | 100 | CROSS 100/ STRAIGHT 90 | 1.9 |
| CM#4 MAIN CPU | OFF | - | 50 | 0.5 | 100 | CROSS 110/ STRAIGHT 100 | 2.1 |
| CM#4 SUB CPU | OFF | - | 50 | 0.5 | 100 | CROSS 110/ STRAIGHT 110 | 2.2 |
| CM#5 MAIN CPU | OFF | - | 50 | 0.3 | 71.4 | CROSS 100/ STRAIGHT 100 | 2 |
| CM#5 SUB CPU | OFF | - | 50 | 0.2 | 62.5 | CROSS 100/ STRAIGHT 100 | 2 |
| CM#6 MAIN CPU | OFF | - | 50 | 0.5 | 100 | CROSS 40/ STRAIGHT 40 | 0.8 |
| CM#6 SUB CPU | OFF | - | 50 | 0.5 | 100 | CROSS 60/ STRAIGHT 50 | 1.1 |
| CM#7 MAIN CPU | OFF | - | 50 | 0.1 | 55.6 | CROSS 80/ STRAIGHT 80 | 1.6 |
| CM#7 SUB CPU | ON | CM#1-CA#0 | 50 | 0.1 | 55.6 | CROSS 40/ STRAIGHT 50 | 0.9 |

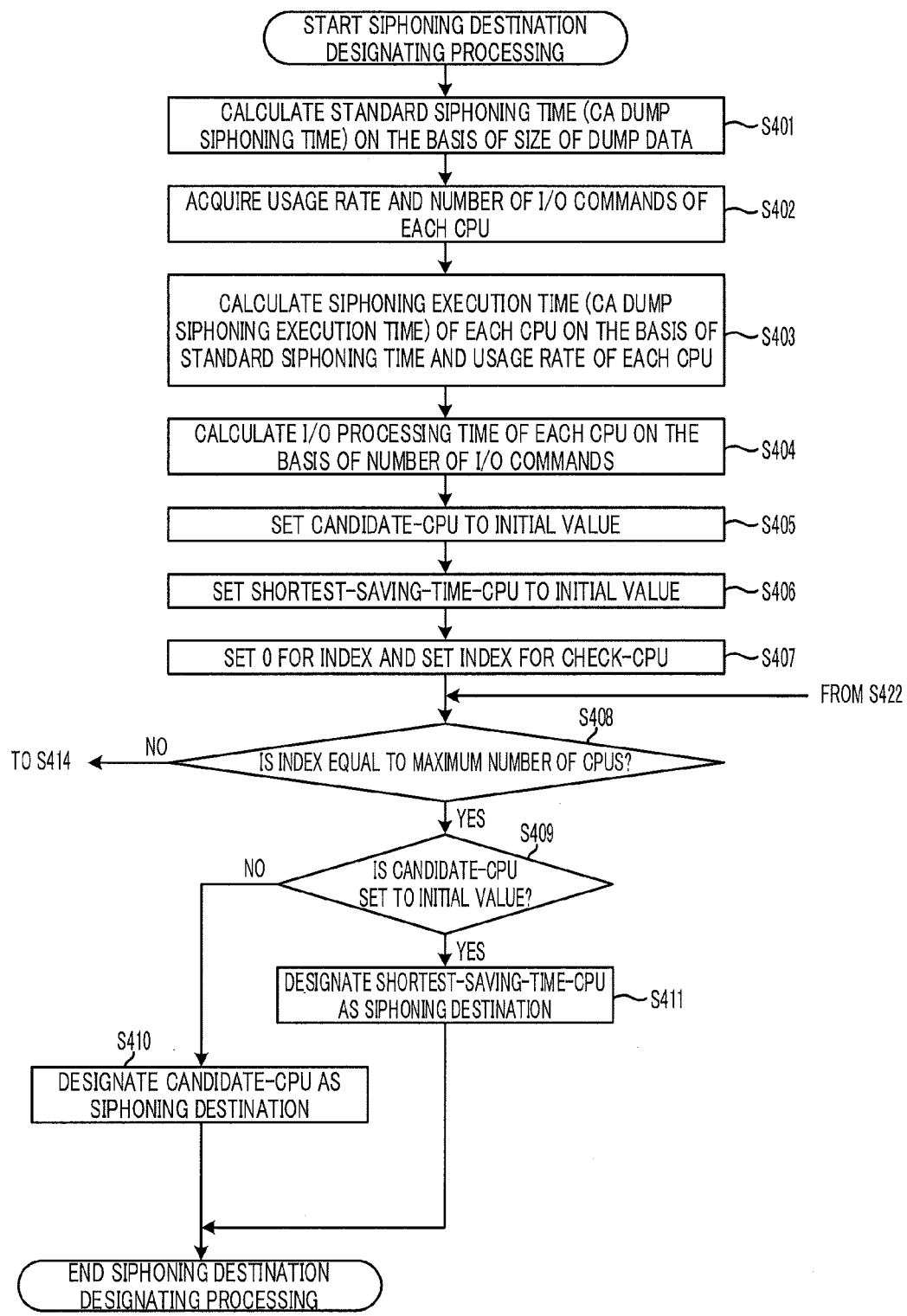

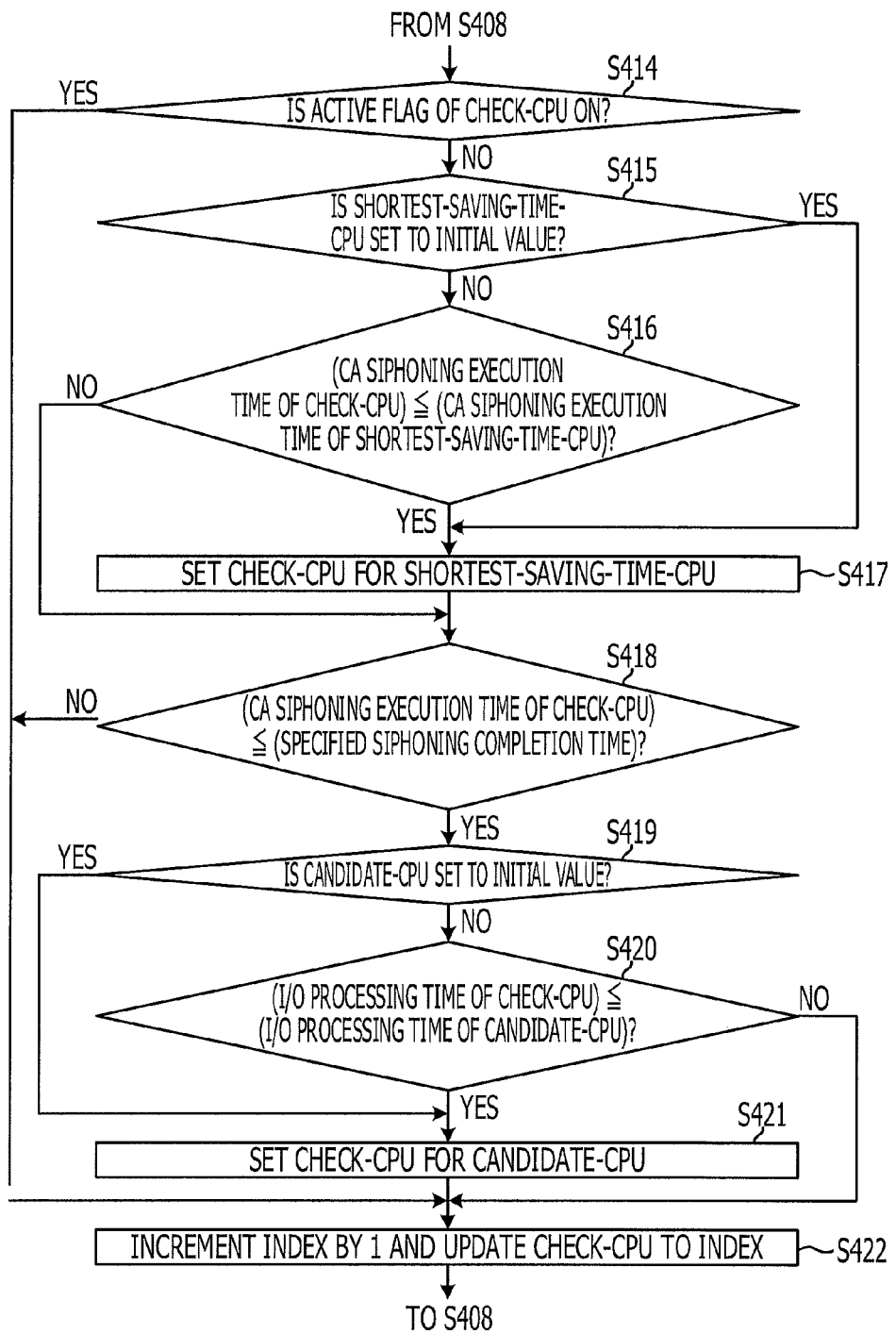

STORAGE SYSTEM AND METHOD FOR CONTROLLING STORAGE SYSTEM

CROSS-REFERENCE TO RELATED APPLICATION

This application is based upon and claims the benefit of priority from the prior Japanese Patent Application No. 2012-147631 filed on Jun. 29, 2012, the entire contents of which are incorporated herein by reference.

FIELD

The embodiments discussed herein are related to a storage system and a method for controlling a storage system.

BACKGROUND

In a storage system, a controller module (hereinafter, referred to as a CM) performs data control for a plurality of disk devices. For example, the CM receives an input/output (I/O) command to a disk device from a host computer via a channel adapter (hereinafter, referred to as a CA), which is an interface to the host computer. Then, the CM controls output and input of data to and from the disk device on the basis of the received I/O command.

Some CAs have a dump function of recording an internal file and the memory contents as dump data (fault information). When an error occurs in a CA having a dump function, a central processing unit (CPU) in a CM collects dump data from the CA in which the error has occurred and saves the collected dump data into a storage device called a bootup and utility device (BUD) in a system. The time from collection of dump data from the CA to completion of saving of the dump data into the BUD by the CPU is referred to as a "siphoning execution time". The processing for collecting dump data from the CA and then saving the collected dump data into the BUD is referred to as "siphoning processing".

For siphoning processing, a specified time is set. Accordingly, a storage system may estimate the "siphoning execution time" before siphoning processing starts and may determine whether or not the processing is terminated within the specified time. Here, in the case where the estimated "siphoning execution time" is within the specified time, the storage system determines that dump data collected from the CA may be recorded into the BUD with certainty. The "siphoning execution time" is calculated on the basis of the time for transferring dump data, the time for compressing the dump data, the time for saving the dump data, the size of the dump data, the usage rate of the CPU, and the like.

After the dump data is collected and saved as described above, the CA in which the error has occurred is isolated from the CM. The dump data saved in the BUD includes fault information and is used for analysis of the error in the CA and recovery from the error.

Japanese Laid-open Patent Publication No. 2001-34508, Japanese Laid-open Patent Publication No. 2007-334668, Japanese Laid-open Patent Publication No. 2005-293224, and Japanese Laid-open Patent Publication No. 2003-271435 disclose related techniques.

In the related arts described above, recording of dump data may not be ensured. For example, in the case where the usage rate of the CPU is high, the "siphoning execution time" may exceed the specified time. In this case, the CPU does not complete the processing for saving dump data collected from the CA into the BUD within the specified time. As a result, the storage system does not save part of the dump data collected from the CA into the BUD.

SUMMARY

According to an aspect of the present invention, provided is a storage system including a plurality of control devices to control output and input of data to and from a storage device. Each of the plurality of control devices includes a storage unit, a saving unit, an interface unit, and an arithmetic processing unit. The interface unit receives an instruction regarding output or input of data to or from the storage device. The arithmetic processing unit receives the instruction from the interface unit and executes the instruction. The arithmetic processing unit stores, when requested to execute saving processing for saving dump data of a specific interface unit in which an error has occurred, the dump data collected from the specific interface unit into the storage unit. The specific interface unit is included in one of the plurality of control devices. The arithmetic processing unit calculates an execution time of the saving processing. The arithmetic processing unit compresses, when the execution time exceeds a time limit and before a remaining time is reached, part of the dump data stored in the storage unit and save the compressed dump data into the saving unit. The arithmetic processing unit saves, when the execution time exceeds the time limit and after the remaining time has been reached, rest of the dump data stored in the storage unit into the saving unit without compression.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a functional block diagram illustrating a configuration of a storage system according to a first embodiment;

FIG. 2 is a functional block diagram illustrating a configuration of a storage system according to a second embodiment;

FIG. 3 illustrates an example of a data structure of a siphoning control table used in a second embodiment;

FIG. 9A is a flowchart illustrating a processing procedure for designating a siphoning destination in a second embodiment; and FIG. 9B is a flowchart illustrating a processing procedure for designating a siphoning destination in a second embodiment.

DESCRIPTION OF EMBODIMENTS

Figure 4:
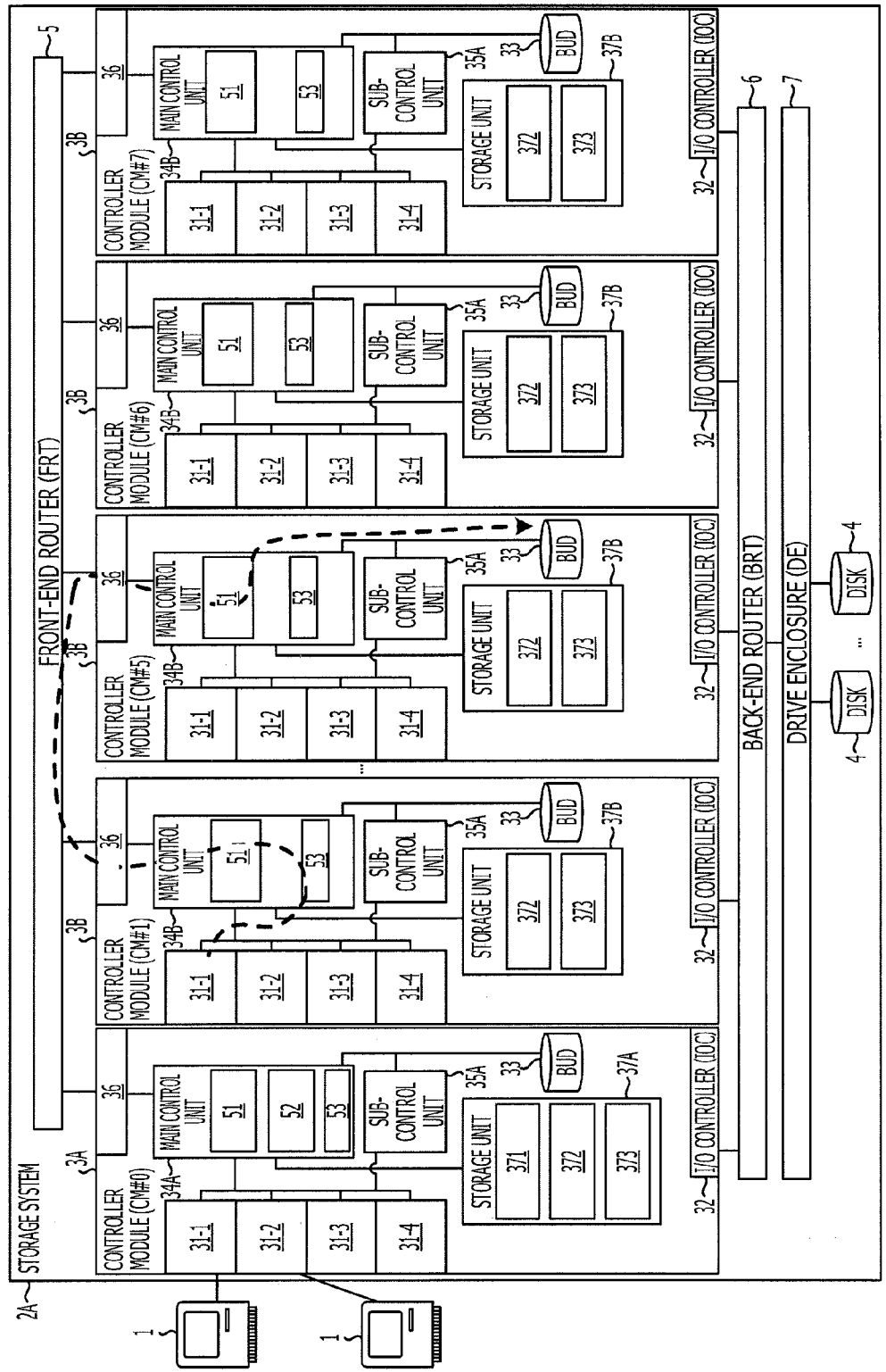
FIG. 4 illustrates an example of a processing operation of a siphoning destination designating part.

Hereinafter, a storage system and a method for controlling a storage system according to embodiments will be described in detail with reference to the drawings. Embodiments are not limited by the described embodiments. The individual embodiments may be combined in an appropriate manner as long as no contradiction arises in the processing details.

First Embodiment

Configuration of Storage System According to First Embodiment

FIG. 1 is a functional block diagram illustrating a configuration of a storage system 2 according to a first embodiment. As illustrated in FIG. 1, the storage system 2 according to the first embodiment includes a controller module (hereinafter, referred to as a CM) 3, which is a control device, and disks 4. The number of CMs 3 provided in the storage system 2 is not limited to the example illustrated in FIG. 1 and one or more CMs 3 are provided in the storage system. Furthermore, the number of disks 4 provided in the storage system 2 is not limited to the example illustrated in FIG. 1.

The storage system 2 according to the first embodiment is connected to host computers 1 that are information processing apparatuses serving as host devices. The storage system 2 receives an I/O command to a disk 4 from a host computer 1, and controls the received I/O command. The number of the host computers 1 connected to the storage system 2 is not limited to the example illustrated in FIG. 1.

The CM 3 is a device that controls output and input of data to and from the disk 4. In the example illustrated in FIG. 1, the number of CMs 3 is one. The disk 4 is a storage device that stores data. The disk 4 may be, for example, a hard disk drive (HDD), a solid state drive (SSD), or the like.

Functional Configuration of CM

The CM 3 includes a plurality of channel adapters (hereinafter, referred to as CAs) 31, which is an interface unit for connecting to the host computers 1, and an I/O controller (hereinafter, referred to as an IOC) 32. The CM 3 also includes a BUD 33, a main control unit 34, a sub-control unit 35, and a storage unit 37. In the case where the main control unit 34 and the sub-control unit 35 are not distinguished from each other, the main control unit 34 and the sub-control unit 35 are referred to as control units. A control unit is an arithmetic processing unit. A single path is used for communication between a CA and a CM in which the CA exists. The number of control units provided in the CM 3 is not limited to the example illustrated in FIG. 1. For example, the CM 3 may include a single control unit.

A CA 31 is a communication interface for communicably connecting to the host computer 1. For example, the CA 31 receives an I/O command, which is a command regarding input and output of data stored in the disk 4, from the host computer 1. A plurality of CAs 31 exist in the CM 3. In the example illustrated in FIG. 1, four CAs 31 (CA 31-1, CA 31-2, CA 31-3, and CA 31-4) exist.

The CA 31 has a dump function of recording an internal file and memory contents as dump data. In the case where an error has occurred in a CA 31, dump data stored in the CA 31 is collected by the main control unit 34 and is saved into the BUD 33 in the storage system 2. In the description provided below, dump data stored in the CA 31 is referred to as "CA dump". Processing of separating a CM, a CA in a CM, or another unit in a CM is referred to as "degradation processing", which is performed when an error occurs in the CM, the CA, or the other unit.

The IOC 32 is a communication interface for communicably connecting to the disks 4. The BUD 33 is a storage device including a CA dump saving region 331 (described later) and stores, in the case where an error has occurred in a CA 31, dump data collected from the CA 31 by the main control unit 34. The dump data saved in the BUD 33 is used later for analyzing the error in the CA 31.

The main control unit 34 is connected to the CAs 31 and is a main control unit for the case where processing in the CM 3 is performed in a distributed manner. Hereinafter, description will be provided on the assumption that the main control unit 34 is a CPU. However, the main control unit 34 may be an electronic circuit such as a micro-processing unit (MPU). The main control unit 34 functions as various functional parts by, for example, executing controller module firmware (CFW) for controlling the CM 3.

In the case where an error has occurred in a CA 31 to which the main control unit 34 is connected, the main control unit 34 performs siphoning processing for dump data stored in the CA 31. For example, the main control unit 34 stores the dump data collected from the CA 31 in the storage unit 37, compresses the dump data in the storage unit 37, and saves the compressed dump data into the BUD 33. Processing for collecting dump data from the CA 31 and then saving the collected dump data into the BUD 33 is referred to as "siphoning processing". A time limit is set for the siphoning processing. In the case where the execution time of the siphoning processing exceeds the time limit in the storage system 2, the siphoning processing goes into time out.

For example, in the case where an error has occurred in a CA 31, the main control unit 34 stores dump data collected from the CA 31 in which the error has occurred into the storage unit 37. Then, in the case where the time for saving the dump data into the BUD 33 exceeds the time limit, the main control unit 34 compresses the dump data stored in the storage unit 37 and saves the compressed dump data into the BUD 33 until a specific remaining time has been reached. When the specific remaining time has been reached, the main control unit 34 saves the dump data stored in the storage unit 37 into the BUD 33 without compressing the dump data.

The sub-control unit 35 is connected to the CAs 31 and is a sub-control unit for the case where processing in the CM 3 is performed in a distributed manner. Hereinafter, description will be provided on the assumption that the sub-control unit 35 is a CPU. However, the sub-control unit 35 may be an electronic circuit such as an MPU. For example, the sub-control unit 35 functions as various functional parts by executing CFW for controlling the CM 3.

The storage unit 37 stores various data to be used for processing by the main control unit 34 or the sub-control unit 35. The storage unit 37 includes a CA dump acquiring buffer 374 (described later) and a CA dump compressing buffer 375 (described later).

As described above, in the storage system 2 according to the first embodiment, in the case where the time for saving dump data into the BUD 33 exceeds a time limit, the CM 3 compresses the dump data stored in the storage unit 37 and saves the compressed dump data into the BUD 33 until a specific remaining time has been reached. When the specific remaining time has been reached, the CM 3 saves the dump data stored in the storage unit 37 into the BUD 33 without compressing the dump data. Thus, even in the case where the CPU usage rate or the I/O load of the main control unit 34 are high and the time for saving dump data into the BUD 33 exceeds a time limit, the CM 3 is capable of recording the dump data collected from the CA 31 with certainty.

Second Embodiment

In the first embodiment, the case where the main control unit 34 that is connected to a CA in which an error has occurred performs siphoning processing for dump data has been described. In a storage system including a plurality of CMs, even in the case where the CPU usage rate or the I/O load of the main control unit 34 connected to a CA in which an error has occurred are high at the time when siphoning processing for dump data starts, the CPU usage rate and the I/O load of a different control unit may be low. Even in the case where the CPU usage rate or the I/O load of the different control unit is high, the CPU usage rate or the I/O load of the different control unit may be lower than the CPU usage rate or the I/O load of the main control unit 34 connected to the CA in which the error has occurred. Accordingly, in the case where an error has occurred in a CA, a control unit having low CPU usage rate or a low I/O load may be selected from the storage system, and the selected control unit may be caused to perform saving processing.

In a second embodiment, an example in which a master CM set in the storage system selects, in the case where an error has occurred in a CA, a control unit having a low CPU usage rate or a low I/O load and causes the selected control unit to perform saving processing will be described.

Configuration of Storage System According to Second Embodiment

FIG. 2 is a functional block diagram illustrating a configuration of a storage system 2A according to the second embodiment. As illustrated in FIG. 2, the storage system 2A includes a CM 3A, CMs 3B, disks 4, and a front-end router (hereinafter, referred to as an FRT) 5. The storage system 2A also includes a back-end router (hereinafter, referred to as a BRT) 6 and a drive enclosure (hereinafter, referred to as a DE) 7. The storage system 2A is connected to host computers 1 serving as host devices. In the storage system 2A according to the second embodiment, units having functions similar to those in the configuration of the storage system 2 illustrated in FIG. 1 are referred to with the same reference numerals and the detailed description thereof will be omitted. In the example illustrated in FIG. 2, regarding the number of CMs provided in the storage system 2A, eight CMs in total, that is, one CM 3A and seven CMs 3B, are provided in the storage system 2A. However, the number of CMs provided in the storage system 2A is not limited to the example illustrated in FIG. 2 as long as three or more CMs are provided in the storage system 2A. In FIG. 2, only four of the seven CMs 3B are illustrated. The number of disks 4 provided in the storage system 2A is not limited to the example illustrated in FIG. 2.

The FRT 5 allows connection between the CMs (the CM 3A and the CMs 3B). The FRT 5 includes four paths used for communication between the CMs. The BRT 6 allows connection between one of the CMs (the CM 3A and the CMs 3B) and one of the disks 4. The DE 7 is a casing to which the disks 4 are loaded.

Here, for example, the CM 3A is defined as a master CM and the CMs 3B are defined as slave CMs. The master CM has a function of selecting, within the storage system 2A, a main control unit or a sub-control unit to which execution of saving processing is requested in the case where an error has occurred in a CA. For the convenience of description, the CM 3A is described as a CM#0 when appropriate. Furthermore, in the case where the CMs 3B are distinguished from one another, the CMs 3B are described as a CM#1, a CM#5, a CM#6, and a CM#7, as illustrated in FIG. 2.

Functional Configuration of Master CM

The CM 3A is a device that controls output and input of data to and from the disks 4. The CM 3A includes a plurality of CAs 31, an IOC 32, a BUD 33, a main control unit 34A, a sub-control unit 35A, an inter-CM communication driver 36, and a storage unit 37A. In the CM 3A in the second embodiment, units having functions similar to those in the configuration of the CM 3 illustrated in FIG. 1 are referred to with the same reference numerals and the detailed description thereof will be omitted. The number of control units provided in the CM 3A is not limited to the example illustrated in FIG. 2. For example, the CM 3A may include a single control unit.

The main control unit 34A is a main control unit for the case where processing in the CM 3A is performed in a distributed manner. The main control unit 34A includes a siphoning processing part 51, a siphoning destination designating part 52, and an information acquiring part 53. Hereinafter, description is provided on the assumption that the main control unit 34A is a CPU. However, the main control unit 34A may be an electronic circuit such as an MPU. The main control unit 34A functions as various functional parts by, for example, executing CFW for controlling the CM 3A.

Upon detecting an error in a CA 31 connected to a control unit, the siphoning processing part 51 included in the control unit causes the siphoning destination designating part 52 of the master CM 3A to designate a siphoning destination for dump data of the CA 31 in which the error is detected. For example, the siphoning processing part 51 transmits, via the inter-CM communication driver 36, a request for acquiring a siphoning destination to the siphoning destination designating part 52 of the master CM 3A. At this time, the siphoning processing part 51 transfers the size of the dump data to the siphoning destination designating part 52 of the master CM 3A.

Then, the siphoning processing part 51 requests the siphoning destination, which is designated by the siphoning destination designating part 52 of the master CM 3A, to save the dump data of the CA 31 in which the error is detected.

The siphoning processing part 51 performs, when requested from another siphoning processing part 51 to save dump data, saving processing for dump data for the CA 31 in which an error has occurred. For example, the siphoning processing part 51 acquires dump data of the CA 31 in which an error has occurred, and saves the acquired dump data into the storage unit 37A with which the siphoning processing part 51 is connected.

Then, the siphoning processing part 51 determines whether or not the execution time of siphoning processing for dump data exceeds a time limit. For example, the siphoning processing part 51 calculates, using Equation (1), the execution time of siphoning processing for dump data. Equation (1) is as follows:

$$\text{CA dump siphoning execution time} = (\text{CA dump siphoning time}) / \{1 - (\text{usage rate of control unit})\} \quad (1)$$

Furthermore, the siphoning processing part 51 calculates, using equation (2), "CA dump siphoning time" in Equation (1). Equation (2) is as follows:

$$\text{CA dump siphoning time} = \{(\text{data transfer time}) + (\text{data compression time})\} \times (\text{CA dump data size}) + (\text{BUD saving time}) \times (\text{compressed CA dump data size}) \quad (2)$$

Here, the data size represents the data size of dump data of a CA in which an error has occurred. The data transfer time represents the communication time for the case where dump data of 1 megabyte (MB) is transferred from the CA in which the error has occurred to the storage unit 37A (or 37B). The data compression time represents the time for the case where data of 1 megabyte is compressed. The BUD saving time represents the time for the case where compressed data of 1 megabyte is saved. In this embodiment, description will be provided on the assumption that the time limit is set to 70 seconds (s). However, the time limit may not be 70 seconds (s) and may be changed.

Here, in the case where the siphoning processing part 51 determines that the CA dump siphoning execution time does not exceed the time limit, the siphoning processing part 51 performs ordinary dump saving processing. In the ordinary dump saving processing, the siphoning processing part 51 compresses dump data stored in the storage unit 37A, and saves the compressed dump data into the BUD 33.

When the siphoning processing part 51 determines that the CA dump siphoning execution time exceeds the time limit, the siphoning processing part 51 performs dump saving processing for the case of exceeding the time limit. In the dump saving processing for the case of exceeding the time limit, the siphoning processing part 51 compresses dump data stored in the storage unit 37A and saves the compressed dump data into the BUD 33 until a specific remaining time has been reached. In this embodiment, an example in which a specific remaining time is set to 350 milliseconds (ms) is described. However, the specific remaining time may not be 350 milliseconds (ms) and may be changed.

Then, when the specific remaining time has been reached, the siphoning processing part 51 calculates a value obtained by subtracting the volume of dump data saved in the BUD 33 from the capacity of the saving region for dump data of the BUD 33. In the case where the calculated value is equal to or greater than the volume of dump data that is not yet saved in the BUD 33, the siphoning processing part 51 saves the dump data stored in the storage unit 37A into the BUD 33, without compressing the dump data.

After completing the siphoning processing for the dump data, the siphoning processing part 51 reads the uncompressed dump data saved in the BUD 33 to the storage unit 37A, compresses the dump data read to the storage unit 37A, and saves the compressed dump data into the BUD 33.

In the case where the specific remaining time has been reached and the value obtained by subtracting the volume of dump data saved in the BUD 33 from the capacity of the saving region for dump data of the BUD 33 is smaller than the volume of dump data that is not yet saved in the BUD 33, the siphoning processing part 51 performs the processing described below. That is, the siphoning processing part 51 keeps the non-saved dump data in the storage unit 37A, without saving the dump data into the BUD 33. After completing the siphoning processing for the dump data, the siphoning processing part 51 compresses the dump data stored in the storage unit 37A and saves the compressed dump data into the BUD 33.

Even before the specific remaining time has been reached, the siphoning processing part 51 may save non-saved dump data into the BUD 33 without compressing the dump data in the case described below. That is, in the case where the value obtained by subtracting the volume of dump data saved in the BUD 33 from the capacity of the saving region for dump data of the BUD 33 is equal to or greater than the dump data not yet saved in the BUD 33, the siphoning processing part 51 saves the non-saved dump data into the BUD 33, without compressing the dump data.

When a request for designating a siphoning destination is issued from the siphoning processing part 51 of the main control unit 34A, the main control unit 34B, or the sub-control unit 35A, the siphoning destination designating part 52 performs the processing described below. That is, the siphoning destination designating part 52 monitors the usage rates of control units provided in a plurality of CMs, and selects a control unit whose dump data saving processing time, which is calculated on the basis of the usage rate, is shorter than a specific time and whose I/O processing time, which is calculated on the basis of the number of I/O commands, is the shortest.

For example, the siphoning destination designating part 52 narrows candidates for a siphoning destination down to control units whose dump data siphoning time for a CA 31 in which an error is detected is shorter than a specified time. Furthermore, the siphoning destination designating part 52 designates a control unit having the shortest processing time, which is converted from the number of I/O commands being processed, for a siphoning destination from among the narrowed down candidates.

Processing performed by the siphoning destination designating part 52 for estimating whether or not processing for siphoning dump data will be completed within a specified time with certainty will be described. For example, the siphoning destination designating part 52 calculates an estimated time for dump data siphoning processing as a "CA dump siphoning time" for each control unit on the basis of the size of CA dump data, and stores the calculated estimated time into a siphoning control table 371. The siphoning destination designating part 52 calculates the "CA dump siphoning time" on the basis of Equation (2).

Furthermore, the siphoning destination designating part 52 acquires the usage rate of each control unit on the basis of CPU usage rate information 372 of each CM. Then, the siphoning destination designating part 52 calculates, using the calculated CA dump siphoning time of each control unit, the estimated times for processing for siphoning dump data corresponding to the usage rate of each control unit as a "CA dump siphoning execution time". Here, the siphoning destination designating part 52 calculates the "CA dump siphoning execution time" on the basis of Equation (1).

Then, the siphoning destination designating part 52 stores the calculated "CA dump siphoning execution time" for each control unit into the siphoning control table 371. The siphoning destination designating part 52 compares the "CA dump siphoning execution time" for each control unit stored in the siphoning control table 371 with a specified time allowed for siphoning, and narrows candidates for a siphoning destination down to control units that are capable of completing siphoning within the specified time. Here, the siphoning destination designating part 52 selects, as candidates for a siphoning destination, control units for which "active flag" is not "ON".

Next, processing performed by the siphoning destination designating part 52 for designating a control unit whose input/output processing time is the shortest among candidates for a siphoning destination will now be described. For example, the siphoning destination designating part 52 acquires the number of I/O commands being processed by each control unit on the basis of command number information 373 for each CM. Then, the siphoning destination designating part 52 calculates the "I/O processing time" for each control unit, which is the processing time for each control unit converted from the acquired number of I/O commands. The siphoning destination designating part 52 calculates the "I/O processing time" of each control unit, using Equation (3), on the basis of the number of I/O commands for straight access not using inter-CM communication and the number of I/O commands for cross access using inter-CM communication. Equation (3) is as follows:

I/O processing time=(the number of I/O commands for cross access)×(I/O command processing time for cross access)+(the number of I/O commands for straight access)×(I/O command processing time for straight access) (3)

The number of I/O commands for cross access represents the number of I/O commands being processed for cross access. The number of I/O commands for cross access includes the number of I/O commands received by inter-CM communication as well as the number of I/O commands transmitted by inter-CM communication. The I/O command processing time for cross access represents the processing time for the case of processing of one I/O command for cross access. The number of I/O commands for straight access represents the number of I/O commands being processed for straight access. The I/O command processing time for straight access represents the processing time for the case of processing of one I/O command for straight access.

Then, the siphoning destination designating part 52 stores the calculated I/O processing time for each control unit into the siphoning control table 371. Then, the siphoning destination designating part 52 designates two siphoning destinations, from among the narrowed down candidates for a siphoning destination, in order from the control unit whose I/O processing time for the control unit stored in the siphoning control table 371 is the shortest. The siphoning destination designating part 52 notifies the requesting CM of the designated siphoning destination. Accordingly, the requesting CM is capable of requesting the designated siphoning destination to collect and save dump data of a CA 31 in which an error is detected.

There may be no control unit whose siphoning time for dump data of a CA 31 in which an error is detected is shorter than a specified time allowed for siphoning dump data. In such a case, the siphoning destination designating part 52 designates a control unit whose CA dump siphoning execution time is the shortest as a siphoning destination. Accordingly, the siphoning destination designating part 52 is capable of causing the designated siphoning destination to collect and save the dump data for the specified time and to perform an examination regarding error using the collected and saved dump data.

The information acquiring part 53 acquires a value of the usage rate of the control unit, and includes the acquired value into the CPU usage rate information 372 stored in the storage unit 37A, which will be described later. The information acquiring part 53 acquires a value of the number of I/O commands, and includes the acquired value into the command number information 373 stored in the storage unit 37A, which will be described later.

The sub-control unit 35A is a sub-control unit for the case where processing in the CM 3A is performed in a distributed manner. The sub-control unit 35A includes a siphoning processing part 51 and an information acquiring part 53. Hereinafter, description will be provided on the assumption that the sub-control unit 35A is a CPU. However, the sub-control unit 35A may be an electronic circuit such as an MPU. The sub-control unit 35A functions as various functional parts by, for example, executing CFW for controlling the CM 3A.

The inter-CM communication driver 36 is a communication interface for communicably connecting to the CMs 3B via the FRT 5.

The storage unit 37A stores various data to be used for processing by the main control unit 34A or the sub-control unit 35A. For example, the storage unit 37A stores the siphoning control table 371, the CPU usage rate information 372, and the command number information 373. Furthermore, the storage unit 37A includes a CA dump acquiring buffer 374 (described later) and a CA dump compressing buffer 375 (described later).

The siphoning control table 371 stores, for each control unit, the estimated time for siphoning processing and the processing time converted from the number of input/output commands being processed in association with each control unit. The siphoning control table 371 is created by, for example, the siphoning destination designating part 52, and is used for designating a siphoning destination. The details of the siphoning control table 371 will be described later.

The CPU usage rate information 372 manages information including the usage rate of each control unit in the CM. The command number information 373 manages information including the number of input/output commands being processed by each control unit in the CM.

Functional Configuration of Slave CM

The CM 3B is a device that controls output and input of data to and from the disks 4. The CM 3B includes a plurality of CAs 31, an IOC 32, a BUD 33, a main control unit 34B, a sub-control unit 35A, an inter-CM communication driver 36, and a storage unit 37B. Units of the CM 3B in the second embodiment having functions similar to those in the configuration of the CM 3A illustrated in FIG. 2 are referred to with the same reference numerals and the detailed description thereof will be omitted. The number of control units provided in the CM 3B is not limited to the example illustrated in FIG. 2. For example, the CM 3B may include a single control unit.

The main control unit 34B is a main control unit for the case where processing in the CM 3B is performed in a distributed manner. The main control unit 34B includes the siphoning processing part 51 and the information acquiring part 53. Hereinafter, description will be provided on the assumption that the main control unit 34B is a CPU. However, the main control unit 34B may be an electronic circuit such as an MPU. The main control unit 34B functions as various functional parts by, for example, executing CFW for controlling the CM 3B.

The storage unit 37B stores various data to be used for processing by the main control unit 34B or the sub-control unit 35A. For example, the storage unit 37B stores the CPU usage rate information 372 and the command number information 373. Furthermore, the storage unit 37B includes a CA dump acquiring buffer 374 (described later) and a CA dump compressing buffer 375 (described later).

Data Structure of Siphoning Control Table

A data structure of the siphoning control table 371 will be described with reference to FIG. 3. FIG. 3 illustrates an example of a data structure of the siphoning control table 371 used in the second embodiment. As illustrated in FIG. 3, the siphoning control table 371 stores an "active flag" item 371b, a "siphoning target CA" item 371c, a "CA dump siphoning time" item 371d, a "CPU usage rate" item 371e, and a "CA dump siphoning execution time" item 371f in association with a "CPU" item 371a. Furthermore, the siphoning control table 371 stores an "I/O command number" item 371g and an "I/O processing time" item 371h in association with the "CPU" item 371a.

The "CPU" item 371a represents a CPU corresponding to a control unit in the case where a CPU is used as the control unit. The "active flag" item 371b is a flag representing whether or not siphoning processing is being performed. For example, in the case where the siphoning processing is being performed, "ON" is set. In the case where the siphoning processing is not being performed, "OFF" is set. The "siphoning target CA" item 371c represents a siphoning target CA in the case where the siphoning processing is being performed.

The "CA dump siphoning time" item 371d represents an estimated time for siphoning processing for dump data by the CPU, which is estimated on the basis of the size of the dump data of the CA. The "CPU usage rate" item 371e represents the usage rate of the CPU. The "CA dump siphoning execution time" item 371f represents an estimated time for performing siphoning processing corresponding to the usage rate of the CPU. The "I/O command number" item 371g represents the number of I/O commands being processed by the CPU. For example, the number of I/O commands for cross access and the number of I/O commands for straight access are individually set. The "I/O processing time" item 371h represents the processing time converted from the number of I/O commands for the CPU.

In the case where the "CPU" item 371a is a "main CPU of the CM#0", for example, "OFF" is stored as the "active flag" item 371b, "-" is stored as the "siphoning target CA" item 371c, and "50" seconds (s) is stored as the "CA dump siphoning time" item 371d. Furthermore, "0.8" is stored as the "CPU usage rate" item 371e, "250" seconds (s) is stored as the "CA dump siphoning execution time" item 371f, "cross 100/straight 100" is stored as the "I/O command number" item 371g, and "2" seconds (s) is stored as the "I/O processing time" item 371h. Furthermore, in the case where the "CPU" item 371a is a "sub-CPU of the CM#7", "CM#1-CA#0" is stored as the "siphoning target CA" item 371c. That is, in the example illustrated in FIG. 3, the sub-CPU of the CM#7 is performing processing for siphoning dump data of the CA#0 in the CM#1.

Processing Operation of Siphoning Destination Designating Part

The processing operation of the siphoning destination designating part 52 will now be described with reference to FIG. 4. FIG. 4 illustrates an example of the processing operation of the siphoning destination designating part 52. The case where an error has occurred in a CA 31 of the CM#1 is illustrated in the example of FIG. 4. In the case where an error has occurred in a CA 31, the main control unit 34B of the CM#1 requests the main control unit 34A of the CM#0 to designate a siphoning destination.

Then, in the main control unit 34A of the CM#0, the siphoning destination designating part 52 designates a siphoning destination. For example, the siphoning destination designating part 52 selects a control unit whose dump data saving processing time, which is calculated on the basis of the usage rate of the control unit provided in the corresponding CM, is shorter than a specific time and whose I/O processing time, which is calculated on the basis of the number of I/O commands, is the shortest.

Here, a case where no control unit whose siphoning time for dump data of a CA 31 in which an error is detected is shorter than a specific siphoning time exists will be described. In this case, the siphoning destination designating part 52 designates a control unit whose CA dump siphoning execution time is the shortest as a siphoning destination. In the example illustrated in FIG. 4, the case where the main control unit 34B of the CM#5, which is the CPU whose CA dump siphoning execution time is the shortest, is designated as a siphoning destination is illustrated. Then, the siphoning destination designating part 52 notifies the main control unit 34B of the CM#1 of the fact that the main control unit 34B of the CM#5 is designated as the siphoning destination. Accordingly, the main control unit 34B of the CM#1 requests the main control unit 34B of the CM#5 to perform siphoning processing for dump data.

Processing Operation of Siphoning Processing Part

Figure 5A:
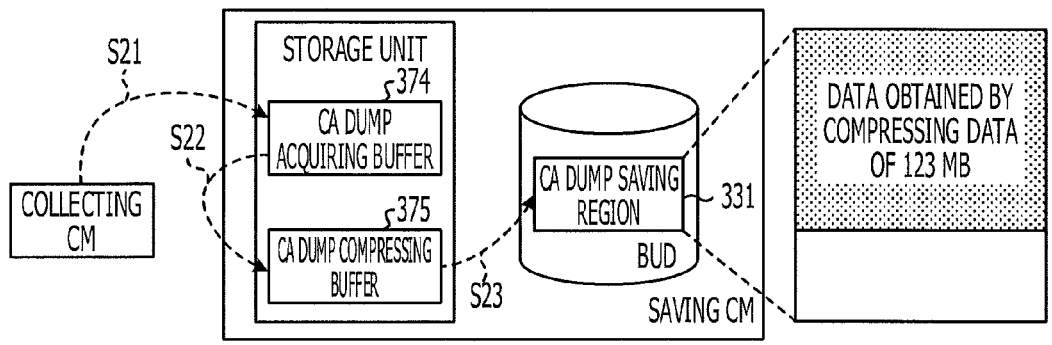
FIG. 5A illustrates an example of a processing operation of a siphoning processing part.
Figure 5B:
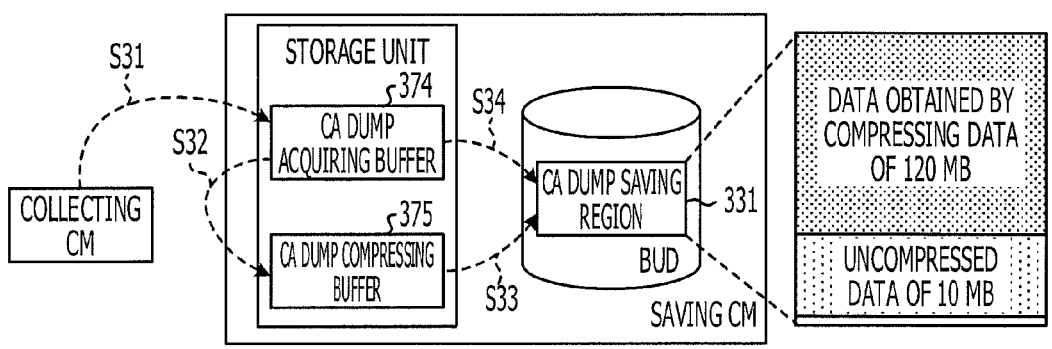
FIG. 5B illustrates an example of a processing operation of a siphoning processing part.
Figure 5C:
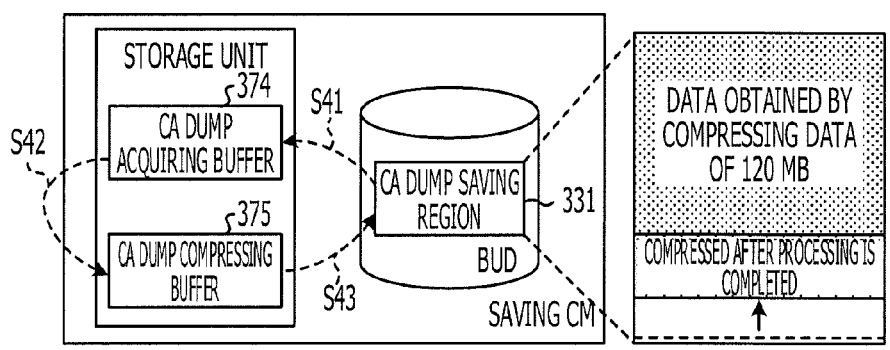
FIG. 5C illustrates an example of a processing operation for compressing uncompressed dump data.

The processing operation of the siphoning processing part 51 will now be described with reference to FIGS. 5A to 5C. FIG. 5A illustrates an example of the processing operation of the siphoning processing part 51 for the case where the CA dump siphoning execution time is within a specified siphoning time. FIG. 5B illustrates an example of the processing operation of the siphoning processing part 51 for the case where the CA dump siphoning execution time exceeds the specified siphoning time. FIG. 5C illustrates an example of the processing operation for compressing uncompressed dump data.

FIG. 5A illustrates the case where the CA dump siphoning execution time is within the specified siphoning time. In the description with reference to FIG. 5A, the conditions for siphoning processing are as described below. For example, the data transfer time is 0.5 (ms/MB), the data compression time is 108.3 (ms/MB), the CA dump data size is 123 (MB), the data saving time is 33.3 (ms/MB), and the data compression rate is 30(%). Here, the size of a CA dump saving region 331 is 50 (MB), the CPU usage rate is 79(%), and the specified siphoning time is 70 seconds (s). Under the above-mentioned conditions, the siphoning processing part 51 calculates using Equation (1) and Equation (2), and obtains "69.6 seconds (s)" as the siphoning execution time. Since the siphoning execution time is within the specified siphoning time, the siphoning processing part 51 determines that ordinary dump saving processing is to be performed.

As illustrated in FIG. 5A, a collecting CM that includes a CA in which an error has occurred collects dump data from the CA in which the error has occurred, and transfers the collected dump data to a saving CM, which is a saving destination (S21). Accordingly, the siphoning processing part 51 of the saving CM saves the received dump data into a CA dump acquiring buffer 374 of the storage unit 37A (or 37B). Then, the siphoning processing part 51 compresses, with a CA dump compressing buffer 375, the dump data read from the CA dump acquiring buffer 374 (S22). The siphoning processing part 51 saves the compressed dump data into the CA dump saving region 331 of the BUD 33 (S23).

FIG. 5B illustrates the case where the CA dump siphoning execution time exceeds the specified siphoning time. In the description with reference to FIG. 5B, the conditions for the siphoning processing are similar to the conditions illustrated in FIG. 5A with the exception in that the CA dump data size is 130 (MB). Under the above-mentioned conditions, the siphoning processing part 51 calculates using Equation (1) and Equation (2), and obtains "73.5 seconds (s)" as the siphoning execution time. Since the siphoning execution time exceeds the specified siphoning time, the siphoning processing part 51 performs dump saving processing for the case of exceeding a time limit.

In the case illustrated in FIG. 5B, the size of data obtained by compressing CA dump data of 130 (MB) is 39 (MB) (=130 (MB)×0.3). The CA dump data region in the BUD 33 is 50 (MB). That is, in the case where the CA dump data is compressed, there is a surplus space for 11 (MB) in the CA dump data region. Thus, the siphoning processing part 51 omits compression processing for the last 10 (MB) of the CA dump data, while utilizing the surplus space of 11 (MB). In other words, the siphoning processing part 51 compresses only 120 (MB) out of 130 (MB) of the CA dump data.

First, processing for compressing dump data of 120 (MB) and saving the compressed dump data will be described. As illustrated in FIG. 5B, a collecting CM that includes a CA in which an error has occurred collects dump data from the CA in which the error has occurred, and transfers the collected dump data to a saving CM, which is a saving destination (S31). Accordingly, the siphoning processing part 51 of the saving CM saves the received dump data into the CA dump acquiring buffer 374 of the storage unit 37A (or 37B). Then, the siphoning processing part 51 compresses, with the CA dump compressing buffer 375, the dump data read from the CA dump acquiring buffer 374 (S32). The siphoning processing part 51 saves the compressed dump data into the CA dump saving region 331 in the BUD 33 (S33).

Then, processing for saving dump data of 10 (MB) without compression will be described. The collecting CM that includes the CA in which the error has occurred collects the dump data from the CA in which the error has occurred, and transfers the collected dump data to the saving CM, which is the saving destination (S31). Accordingly, the siphoning processing part 51 of the saving CM saves the received dump data into the CA dump acquiring buffer 374 of the storage unit 37A (or 37B). Then, the siphoning processing part 51 saves the dump data read from the CA dump acquiring buffer 374 into the CA dump saving region 331 in the BUD 33 (S34).

Here, the "CA dump siphoning time" by the siphoning processing part 51 for the case where dump data is compressed and saved is calculated by {(data transfer time)+(data compression time)}×(CA dump data size)+(data saving time)×(compressed CA dump data size). That is, the "CA dump siphoning time" is 14.26 (s) (=(0.5 (ms/MB)+108.3 (ms/MB))×120 (MB)+33.3 (ms/MB)×120 (MB)×0.3). Furthermore, the "CA dump siphoning execution time" in this case is calculated by (CA dump siphoning time)/{1−(CPU usage rate)}. That is, the "CA dump siphoning execution time" is 67.9 (s) (=14.26 (s)/(1−0.79)).

The "CA dump siphoning time" by the siphoning processing part 51 for the case where dump data is saved without compression is calculated by (data transfer time)×(CA dump data size)+(data saving time)×(CA dump data size). That is, the "CA dump siphoning time" is 338 (ms) (=0.5 (ms/MB)× 10 (MB)+33.3 (ms/MB)×10 (MB)). Furthermore, the "CA dump siphoning execution time" in this case is calculated by (CA dump siphoning time)/{1−(CPU usage rate)}. That is, the "CA dump siphoning execution time" is 1.6 (s) (=338 (ms)/(1−0.79)).

As described above, the processing time for compressing dump data of 120 (MB) and saving the compressed dump data by the siphoning processing part 51 is 67.9 seconds (s), and the processing time for saving dump data of 10 (MB) without compressing the dump data is 1.6 seconds (s). That is, the total saving time is 69.5 (s) (=67.9 (s)+1.6 (s)), which is shorter than the specified siphoning time, which is 70 seconds (s). Accordingly, the siphoning processing part 51 is capable of siphoning dump data. For uncompressed dump data, the siphoning processing part 51 performs compression processing after the CA dump siphoning processing has been completed.

Processing for compressing uncompressed dump data will now be described with reference to FIG. 5C. As illustrated in FIG. 5C, the siphoning processing part 51 reads uncompressed dump data from the CA dump saving region 331 in the BUD 33, and saves the read uncompressed dump data into the CA dump acquiring buffer 374 (S41). Then, the siphoning processing part 51 compresses, with the CA dump compressing buffer 375, the dump data read from the CA dump acquiring buffer 374 (S42). The siphoning processing part 51 saves the compressed dump data into the CA dump saving region 331 in the BUD 33 (S43).

Processing Procedure of Processing by Storage System

The processing procedure of processing by the storage system will now be described with reference to FIGS. 6 to 8, FIG. 9A, and FIG. 9B. The processing procedure of siphoning processing for CA dump will be described with reference to FIG. 6, and the processing procedure of dump saving processing for the case of exceeding a time limit will be described with reference to FIG. 7. The processing procedure of processing for compressing uncompressed dump data will be described with reference to FIG. 8. The processing procedure of processing for designating a siphoning destination will be described with reference to FIGS. 9A and 9B.

Siphoning Processing for CA Dump

Figure 6:
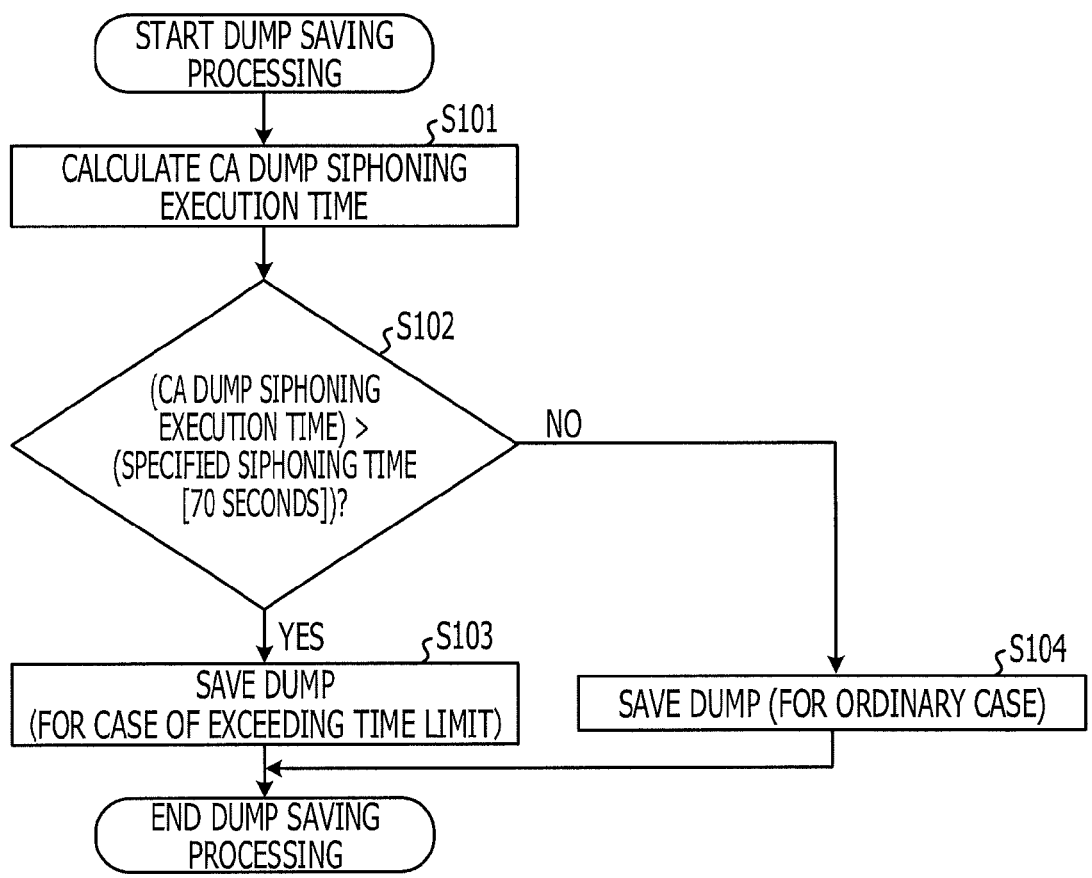
FIG. 6 is a flowchart illustrating a processing procedure of CA dump siphoning processing.

FIG. 6 is a flowchart illustrating the processing procedure of siphoning processing for CA dump. In the case where the siphoning processing part 51 is requested to perform processing for saving dump data, the siphoning processing part 51 performs the processing described below.

As illustrated in FIG. 6, the siphoning processing part 51 calculates the CA dump siphoning execution time (S101). Then, the siphoning processing part 51 determines whether or not the CA dump siphoning execution time is longer than a specified siphoning time, which is 70 seconds (s) (S102).

In the case where the siphoning processing part 51 determines that the CA dump siphoning execution time is longer than the specified siphoning time, which is 70 seconds (s), (YES in S102), the siphoning processing part 51 performs dump saving for the case of exceeding the time limit (S103), and terminates the processing.

In the case where the siphoning processing part 51 determines that the CA dump siphoning execution time is shorter than or equal to the specified siphoning time, which is 70 seconds (s), (NO in S102), the siphoning processing part 51 performs ordinary dump saving (S104), and terminates the processing.

Dump Saving Processing by Storage System for Case of Exceeding Time Limit

Figure 7:
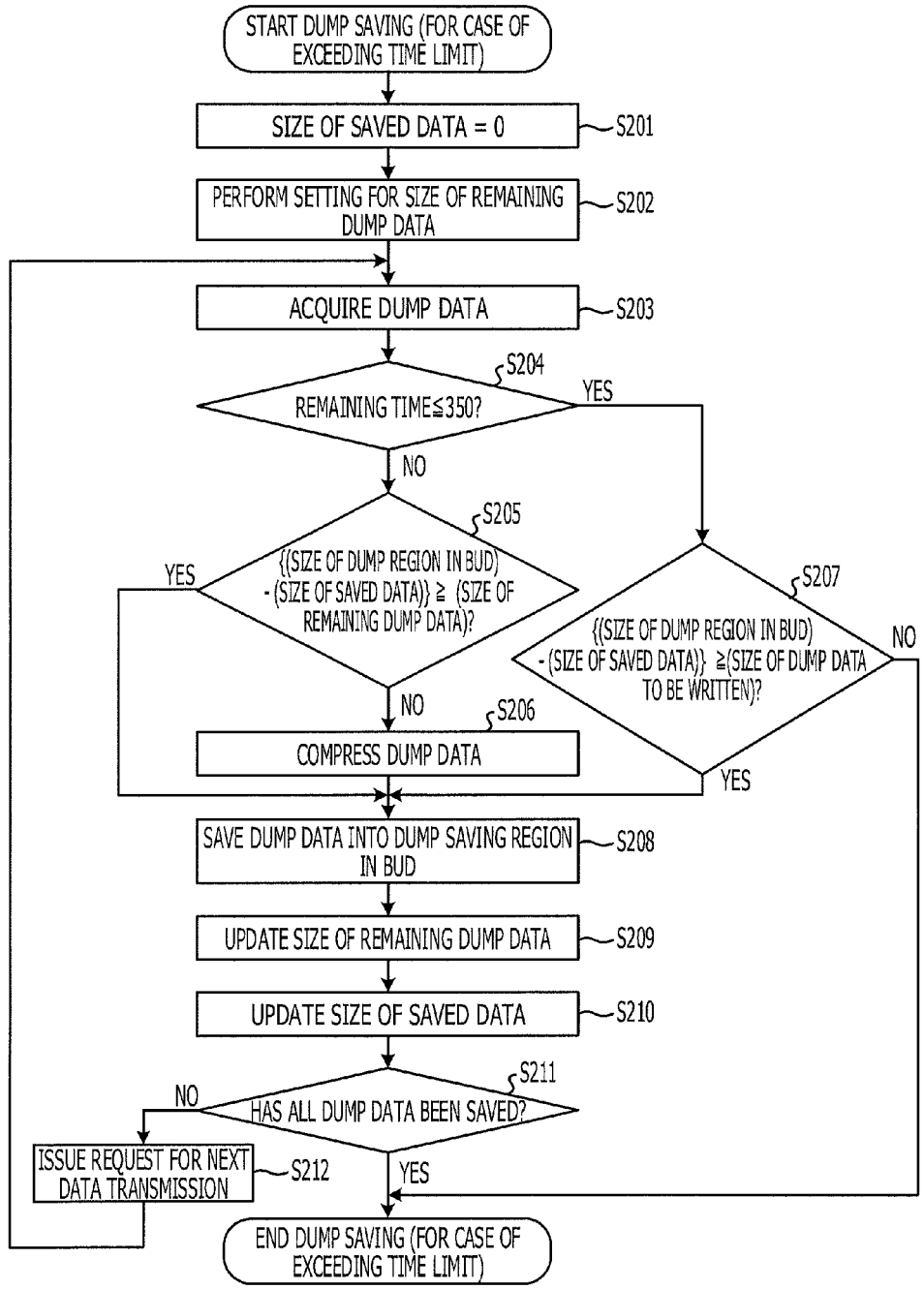
FIG. 7 is a flowchart illustrating a processing procedure of dump saving processing by a storage system.

FIG. 7 is a flowchart illustrating the processing procedure of dump saving processing by the storage system for the case of exceeding a time limit. In the case where the siphoning processing part 51 determines that the CA dump siphoning execution time exceeds a specified siphoning time, which is 70 seconds (s), the siphoning processing part 51 performs the processing described below.

As illustrated in FIG. 7, the siphoning processing part 51 sets the size of the saved data to 0 (S201). Then, the siphoning processing part 51 performs setting for the size of remaining dump data (S202). Then, the siphoning processing part 51 acquires the dump data into the CA dump acquiring buffer 374 of the storage unit 37A (or 37B) (S203).

The siphoning processing part 51 determines whether or not the remaining time is within a specific remaining time (S204). In this example, description is provided on the assumption that the specific remaining time is 350 ms. In the case where the siphoning processing part 51 determines that the remaining time exceeds the specific remaining time (NO in S204), the siphoning processing part 51 performs the processing described below. That is, the siphoning processing part 51 determines whether or not the value obtained by subtracting the size of the saved data from the size of the CA dump saving region 331 in the BUD 33 is equal to or greater than the size of remaining dump data (S205).

In the case where the siphoning processing part 51 determines that the value obtained by subtracting the size of the saved data from the size of the CA dump saving region 331 in the BUD 33 is smaller than the size of the remaining dump data (NO in S205), the siphoning processing part 51 performs the processing described below. That is, the siphoning processing part 51 compresses the dump data (S206), and proceeds to S208. Meanwhile, in the case where the siphoning processing part 51 determines that the value obtained by subtracting the size of the saved data from the size of the CA dump saving region 331 in the BUD 33 is equal to or greater than the size of the remaining dump data (YES in S205), the siphoning processing part 51 proceeds to S208.

In the case where the siphoning processing part 51 determines that the remaining time is within the specific remaining time (YES in S204), the siphoning processing part 51 performs the processing described below. That is, the siphoning processing part 51 determines whether or not the value obtained by subtracting the size of the saved data from the size of the CA dump saving region 331 in the BUD 33 is equal to or greater than the size of dump data to be written (S207).

In the case where the siphoning processing part 51 determines that the value obtained by subtracting the size of the saved data from the size of the CA dump saving region 331 in the BUD 33 is equal to or greater than the size of dump data to be written (YES in S207), the siphoning processing part 51 proceeds to S208. In the case where the siphoning processing part 51 determines that the value obtained by subtracting the size of the saved data from the size of the CA dump saving region 331 in the BUD 33 is smaller than the size of dump data to be written (NO in S207), the size of dump data to be written exceeds the remaining writing region. Thus, the siphoning processing part 51 terminates the processing.

The siphoning processing part 51 saves the dump data into the CA dump saving region 331 in the BUD 33 (S208). Then, the siphoning processing part 51 updates the size of the remaining dump data (S209), and updates the size of the saved data (S210).

Then, the siphoning processing part 51 determines whether or not all the dump data has been saved (S211). In the case where the siphoning processing part 51 determines that a part of the dump data has not been saved (NO in S211), the siphoning processing part 51 issues a request for transmission of the next dump data (S212). Then, the siphoning processing part 51 proceeds to S203. In the case where the siphoning processing part 51 determines that all the dump data has been saved (YES in S211), the siphoning processing part 51 terminates the processing.

Compression Processing for Uncompressed Dump Data

Figure 8:
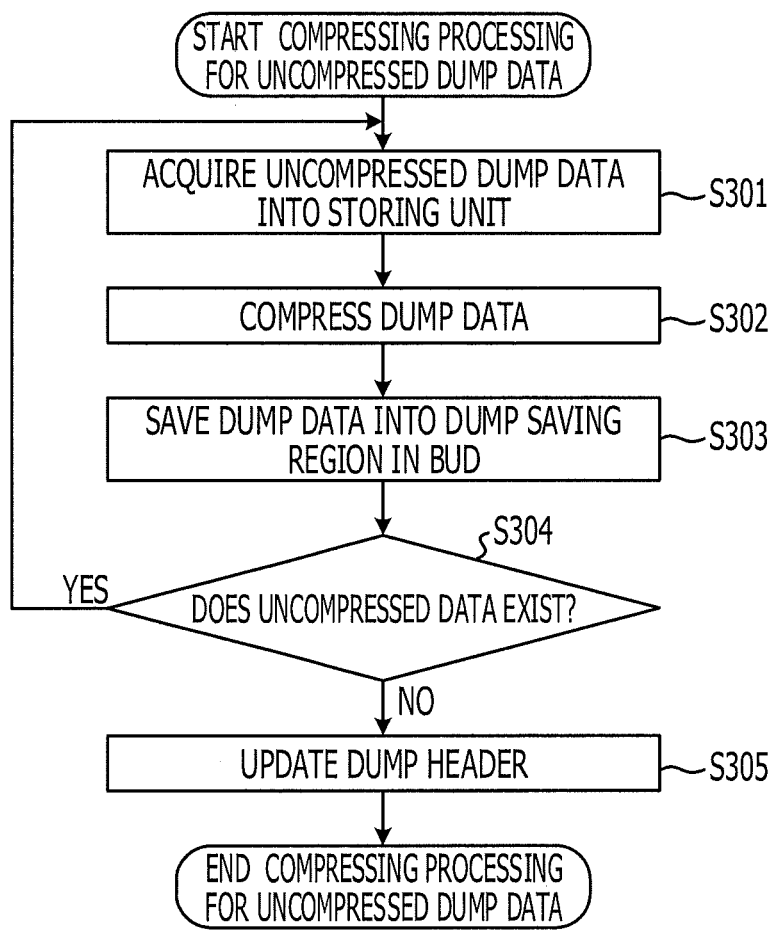
FIG. 8 is a flowchart illustrating a processing procedure for compressing uncompressed dump data.

FIG. 8 is a flowchart illustrating the processing procedure of compression processing for uncompressed dump data. After saving processing for the dump data is terminated, the siphoning processing part 51 performs the processing described below. As illustrated in FIG. 8, the siphoning processing part 51 acquires uncompressed dump data into the CA dump acquiring buffer 374 of the storage unit 37A (or 37B) (S301). Then, the siphoning processing part 51 compresses the acquired dump data (S302). Then, the siphoning processing part 51 saves the compressed dump data into the CA dump saving region 331 of the BUD 33 (S303).

The siphoning processing part 51 determines whether or not uncompressed data exists (S304). In the case where the siphoning processing part 51 determines that uncompressed data exists (YES in S304), the siphoning processing part 51 proceeds to S301. In the case where the siphoning processing part 51 determines that no uncompressed data exists (NO in S304), the siphoning processing part 51 updates a dump header (S305). Then, the siphoning processing part 51 terminates the processing.

Siphoning Destination Designating Processing

FIGS. 9A and 9B are flowcharts illustrating the processing procedure of siphoning destination designating processing in the second embodiment. Here, it is assumed that an index is assigned in advance for each CPU that may serve as a siphoning destination. For example, "0" is assigned for the main CPU of the CM#0, "1" is assigned for the sub-CPU of the CM#0, "2" is assigned for the main CPU of the CM#1, and "3" is assigned for the sub-CPU of the CM#1.

For example, upon receiving a command for acquiring a siphoning destination CPU including the size of dump data of a CA in which an error has occurred, the siphoning destination designating part 52 calculates, using Equation (2), a standard CA dump siphoning time, on the basis of the size of the dump data (S401). Then, the siphoning destination designating part 52 stores the calculated CA dump siphoning time into the siphoning control table 371.

Then, the siphoning destination designating part 52 acquires the usage rate of CPU and the number of I/O commands from each CPU (S402). The usage rate of each CPU is stored in the CPU usage rate information 372 for each CM. The number of I/O commands for each CPU is stored in the command number information 373 for each CM.

Then, the siphoning destination designating part 52 calculates, using Equation (1), the CA dump siphoning execution time of each CPU on the basis of the standard siphoning time and the usage rate of each CPU (S403). Then, the siphoning destination designating part 52 stores the calculated CA dump siphoning execution time for each CPU into the siphoning control table 371.

Furthermore, the siphoning destination designating part 52 calculates the I/O processing time for each CPU on the basis of the number of I/O commands (S404). Then, the siphoning destination designating part 52 stores the calculated I/O processing time for each CPU into the siphoning control table 371.

Then, the siphoning destination designating part 52 sets CANDIDATE-CPU to an initial value (for example, 0xFF) (S405). The CANDIDATE-CPU is a variable representing a CPU candidate for a siphoning destination CPU, and the value of the index assigned for the CANDIDATE-CPU is set. Furthermore, the siphoning destination designating part 52 sets SHORTEST-SAVING-TIME-CPU to an initial value (for example, 0xFF) (S406). The SHORTEST-SAVING-TIME-CPU is a variable representing a CPU whose dump data saving time is the shortest, and the value of the index assigned for the CPU whose saving time is the shortest is set.

Then, the siphoning destination designating part 52 sets INDEX to the value 0, which is the index of the CPU serving as a siphoning destination, and sets CHECK-CPU to the value set for the INDEX (S407). The INDEX is a variable, and the value of the index assigned for a CPU is set. The CHECK-CPU is variable representing a CPU that is checked whether to be a siphoning destination, and the value of the index assigned for the CPU is set.

Then, the siphoning destination designating part 52 determines whether or not the value set for the INDEX is equal to the maximum number of the CPUs that may serve as a siphoning destination (S408).

In the case where it is determined that the value set for the INDEX is not equal to the maximum number of the CPUs (NO in S408), the siphoning destination designating part 52 proceeds to S414.

The siphoning destination designating part 52 determines whether or not the active flag of the CHECK-CPU is ON, on the basis of the active flag stored in the siphoning control table 371 (S414). In the case where it is determined that the active flag of the CHECK-CPU is ON (YES in S414), the siphoning destination designating part 52 proceeds to S422 to check the next CPU.

In the case where it is determined that the active flag of the CHECK-CPU is not ON (NO in S414), the siphoning destination designating part 52 determines whether or not the SHORTEST-SAVING-TIME-CPU is set to the initial value (S415). In the case where it is determined that the SHORTEST-SAVING-TIME-CPU is set to the initial value (YES in S415), the siphoning destination designating part 52 proceeds to S417 to set the CHECK-CPU for the SHORTEST-SAVING-TIME-CPU.

In the case where it is determined that the SHORTEST-SAVING-TIME-CPU is not set to the initial value (NO in S415), the siphoning destination designating part 52 determines whether or not the CA siphoning execution time of the CHECK-CPU is shorter than or equal to the CA siphoning execution time of the SHORTEST-SAVING-TIME-CPU (S416). In the case where it is determined that the CA siphoning execution time of the CHECK-CPU is shorter than or equal to the CA siphoning execution time of the SHORTEST-SAVING-TIME-CPU (YES in S416), the siphoning destination designating part 52 proceeds to S417 to set the CHECK-CPU for the SHORTEST-SAVING-TIME-CPU.

The siphoning destination designating part 52 sets the CHECK-CPU for the SHORTEST-SAVING-TIME-CPU (S417). That is, the siphoning destination designating part 52 sets the CHECK-CPU currently being checked for as the CPU whose saving time is the shortest among the checked CPUs.

In the case where the CA siphoning execution time of the CHECK-CPU is longer than the CA siphoning execution time of the SHORTEST-SAVING-TIME-CPU (NO in S416), the siphoning destination designating part 52 determines whether or not the CA siphoning execution time of the CHECK-CPU is shorter than or equal to a specified siphoning completion time (S418). The specified siphoning completion time represents a specified time allowed for siphoning. In the case where it is determined that the CA siphoning execution time of the CHECK-CPU is longer than the specified siphoning completion time (NO in S418), the siphoning destination designating part 52 proceeds to S422 to check the next CPU.

In the case where it is determined that the CA siphoning execution time of the CHECK-CPU is shorter than or equal to the specified siphoning completion time (YES in S418), the siphoning destination designating part 52 determines whether or not the CANDIDATE-CPU is set to the initial value (S419). In the case where it is determined that the CANDIDATE-CPU is not set to the initial value (NO in S419), the siphoning destination designating part 52 determines whether or not the I/O processing time of the CHECK-CPU is shorter than or equal to the I/O processing time of the CANDIDATE-CPU (S420). In the case where it is determined that the I/O processing time of the CHECK-CPU is longer than the I/O processing time of the CANDIDATE-CPU (NO in S420), the siphoning destination designating part 52 proceeds to S422 to check the next CPU.

In the case where the CANDIDATE-CPU is set to the initial value (YES in S419) or the I/O processing time of the CHECK-CPU is shorter than or equal to the I/O processing time of the CANDIDATE-CPU (YES in S420), the siphoning destination designating part 52 proceeds to S421. The siphoning destination designating part 52 sets the CHECK-CPU for the CANDIDATE-CPU (S421). That is, the siphoning destination designating part 52 sets the CHECK-CPU currently being checked for as the CPU whose CA siphoning execution time is shorter than the specified siphoning completion time and whose I/O processing time is the shortest among the checked CPUs.

The siphoning destination designating part 52 increments the INDEX by 1, and updates the CHECK-CPU to the Index (S422). Then, the siphoning destination designating part 52 proceeds to S408.

In the case where it is determined in S408 that the value set for the INDEX is equal to the maximum number of CPUs that may serve as a siphoning destination (YES in S408), the siphoning destination designating part 52 determines whether or not the CANDIDATE-CPU is set to the initial value (S409). In the case where it is determined that the CANDIDATE-CPU is not set to the initial value (NO in S409), the siphoning destination designating part 52 designates the CANDIDATE-CPU as a siphoning destination (S410), and terminates the siphoning destination designating processing.

In the case where it is determined that the CANDIDATE-CPU is set to the initial value (YES in S409), the siphoning destination designating part 52 designates the SHORTEST-SAVING-TIME-CPU as a siphoning destination (S411), and terminates the siphoning destination designating processing.

Effects of Second Embodiment

As described above, the storage system 2A according to the second embodiment selects a CPU that is processing the smallest number of I/O commands, on the basis of the number of I/O commands being processed by each CPU, to perform siphoning processing for CA dump. That is, the storage system 2A according to the second embodiment separates a collecting CM and a saving CM from each other. Accordingly, the storage system 2A according to the second embodiment is capable of reducing the influence of processing for siphoning dump data of a CA on the performance of the storage system 2A, and the possibility of completing the siphoning of CA dump is increased.

In the storage system 2A according to the second embodiment, in the case where the CA dump siphoning execution time exceeds the specified siphoning time, dump data stored in the storage unit 37A is compressed and the compressed dump data is saved into the BUD until a specific remaining time has been reached. In the storage system 2A, when the specific remaining time has been reached, the value obtained by subtracting the volume of dump data saved in the BUD 33 from the capacity of the saving region for dump data in the BUD 33 is calculated. Here, in the case where the calculated value is equal to or greater than the volume of dump data that is not yet saved in the BUD 33, the storage system 2A saves the dump data stored in the storage unit 37A into the BUD 33 without compressing the dump data. Thus, even in the case where the CA dump siphoning execution time exceeds the specified siphoning time, the storage system 2A is capable of recording dump data collected from the CA 31 with certainty.

After completing the siphoning processing, the storage system 2A reads dump data saved in the BUD 33 without compression into the storage unit 37A (or 37B), compresses the read dump data, and saves the compressed dump data into the BUD 33. Accordingly, the storage system 2A is capable of efficiently using the CA dump saving region 331 of the BUD 33.

In the case where the CA dump siphoning execution time exceeds the specified siphoning time, the storage system 2A omits compression of dump data. Furthermore, dump data may be kept in the storage unit 37A (or 37B) without saving the dump data into the BUD 33 when a time for saving the dump data is not ensured. Accordingly, the storage system 2A seems to quickly terminate the CA dump siphoning processing. Due to such omissions, the storage system 2A is capable of further reducing the processing time by several hundred milliseconds, and the probability of saving CA dump even when the CPU is highly loaded is increased.

In the case where saving into the BUD 33 is omitted, a large amount of uncompressed dump data exists in the storage unit 37A (or 37B). The size of CA dump data is approximately 130 (MB). Normally, the capacity of the storage unit 37A (or 37B) is between 64 (MB) and 168 (MB) per CPU. Thus, in the case where the remaining storage capacity of the storage unit 37A (or 37B) is not enough, dump data may be saved into the storage unit 37A (or 37B) provided in a different CM, from the middle of the processing. In other words, in the case where dump data that is acquired from a CA 31 in which an error has occurred and that is stored in the storage unit 37A (or 37B) connected to the siphoning processing part 51 is not saved in the BUD 33, the siphoning processing part 51 may cause the dump data to be stored into the storage unit 37A (or 37B) of a different CM. Accordingly, the storage system 2A is capable of increasing the probability of saving CA dump.

In the storage system 2A according to the second embodiment, the siphoning destination designating part 52 may be provided in the CM 3B. In this case, the storage unit 37B of the CM 3B stores the siphoning control table 371.

Other Embodiments

Various other embodiments may be implemented. Other embodiments will be described.

System Configuration

All or part of the processing that has been described as being automatically performed in the foregoing embodiments may be performed manually. Alternatively, all or part of the processing that has been described as being manually performed may be performed automatically in a known method. Furthermore, the processing procedures, control procedures, and specific names illustrated in the description and drawings may be changed unless otherwise specified.

Furthermore, in the storage system 2 according to the first embodiment, in the case where an error has occurred in a CA 31, the main control unit 34 may select a saving destination for dump data collected from the CA 31 on the basis of the usage rates and the number of I/O commands of control units in the storage system 2.

Furthermore, the order of the processing procedure of the individual processing operations described in the foregoing embodiments may be changed in accordance with various loads and use conditions. Furthermore, component parts in the drawings are illustrated in terms of functional concepts and may not be physically configured as illustrated. Furthermore, all or part of the processing functions in the individual devices may be implemented by a CPU analyzing and executing a program or may be implemented as hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a plurality of control devices to control output and input of data to and from a storage device, the plurality of control devices each including:
a storage unit,
a saving unit,
an interface unit configured to receive an instruction regarding output or input of data to or from the storage device, and
an arithmetic processing unit configured to
receive the instruction from the interface unit and execute the instruction,
store, when requested to execute saving processing for saving dump data of a specific interface unit in which an error has occurred, the dump data collected from the specific interface unit into the storage unit, the specific interface unit being included in one of the plurality of control devices,
calculate an execution time of the saving processing,
compress, when the execution time exceeds a time limit and before a remaining time is reached, part of the dump data stored in the storage unit and save the compressed dump data into the saving unit, and
save, when the execution time exceeds the time limit and after the remaining time has been reached, the rest of the dump data stored in the storage unit into the saving unit without compression.

2. The storage system according to claim 1, wherein the arithmetic processing unit is configured to
save, when a value obtained by subtracting a volume of dump data that has been saved in the saving unit from a capacity of a saving region for dump data in the saving unit is equal to or greater than a volume of non-saved dump data that has not been saved in the saving unit, the non-saved dump data into the saving unit without compressing the non-saved dump data even before the remaining time is reached.

3. The storage system according to claim 1, wherein
the arithmetic processing unit is configured to
read, after the saving processing has been completed, the dump data saved in the saving unit without compression to the storage unit,
compress the read dump data, and
save the compressed dump data into the saving unit.

4. The storage system according to claim 1, wherein the arithmetic processing unit is configured to
keep, after the remaining time has been reached and when a value obtained by subtracting a volume of dump data that has been saved in the saving unit from a capacity of a saving region for dump data in the saving unit is smaller than a volume of non-saved dump data that has not been saved in the saving unit, the non-saved dump data in the storage unit without saving the non-saved dump data into the saving unit.

5. The storage system according to claim 4, wherein the arithmetic processing unit is configured to
store part of the non-saved dump data into a storage unit included in another control device.

6. The storage system according to claim 4, wherein the arithmetic processing unit is configured to
compress, after the saving processing has been completed, the dump data stored in the storage unit and save the compressed dump data into the saving unit.

7. A method for controlling a storage system including a plurality of control devices, the plurality of control devices each including a storage unit, a saving unit, an interface unit, and an arithmetic processing unit, the method comprising:
receiving, by a first interface unit, an instruction regarding output or input of data to or from a storage device, the first interface unit being included in a first control device out of the plurality of control devices;

receiving, by a first arithmetic processing unit, the instruction from the first interface unit and executing the instruction, the first arithmetic processing unit being included in the first control device;

storing by the first arithmetic processing unit, when requested to execute saving processing for saving dump data of a second interface unit in which an error has occurred, the dump data collected from the second interface unit into a first storage unit included in the first control device, the second interface unit being included in a second control device out of the plurality of control devices;

calculating, by the first arithmetic processing unit, an execution time of the saving processing;

compressing by the first arithmetic processing unit, when the execution time exceeds a time limit and before a remaining time is reached, part of the dump data stored in the first storage unit and saving the compressed dump data into a first saving unit included in the first control device; and saving by the first arithmetic processing unit, when the execution time exceeds the time limit and after the remaining time has been reached, the rest of the dump data stored in the first storage unit into the first saving unit without compression.

8. The method according to claim 7, further comprising:

saving by the first arithmetic processing unit, when a value obtained by subtracting a volume of dump data that has been saved in the first saving unit from a capacity of a saving region for dump data in the first saving unit is equal to or greater than a volume of non-saved dump data that has not been saved in the first saving unit, the non-saved dump data into the first saving unit, without compressing the non-saved dump data even before the remaining time is reached.

9. The method according to claim 7, further comprising:

reading by the first arithmetic processing unit, after the saving processing has been completed, the dump data saved in the first saving unit without compression to the first storage unit;

compressing, by the first arithmetic processing unit, the read dump data; and saving, by the first arithmetic processing unit, the compressed dump data into the first saving unit.

10. The method according to claim 7, further comprising:

keeping by the first arithmetic processing unit, after the remaining time has been reached and when a value obtained by subtracting a volume of dump data that has been saved in the first saving unit from a capacity of a saving region for dump data in the first saving unit is smaller than a volume of non-saved dump data that has not been saved in the first saving unit, the non-saved dump data in the first storage unit without saving the non-saved dump data into the first saving unit.

11. The method according to claim 10, further comprising:

storing, by the first arithmetic processing unit, part of the non-saved dump data into a storage unit included in another control device.

12. The method according to claim 10, further comprising:

compressing by the first arithmetic processing unit, after the saving processing has been completed, the dump data stored in the first storage unit and saving the compressed dump data into the first saving unit.

* * * * *